United States Patent
Arvidsson

(10) Patent No.: US 9,832,133 B2
(45) Date of Patent: Nov. 28, 2017

(54) NETWORK NODE FOR CONTROLLING TRANSPORT OF DATA IN A WIRELESS COMMUNICATION NETWORK

(71) Applicant: TELEFONAKTIEBOLAGET L M ERICSSON (PUBL), Stockholm (SE)

(72) Inventor: Åke Arvidsson, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 49 days.

(21) Appl. No.: 14/892,506

(22) PCT Filed: Mar. 24, 2014

(86) PCT No.: PCT/SE2014/050358
§ 371 (c)(1),
(2) Date: Nov. 19, 2015

(87) PCT Pub. No.: WO2014/193288
PCT Pub. Date: Dec. 4, 2014

(65) Prior Publication Data
US 2016/0094466 A1    Mar. 31, 2016

Related U.S. Application Data

(60) Provisional application No. 61/829,315, filed on May 31, 2013.

(51) Int. Cl.
| | |
|---|---|
| *H04W 80/04* | (2009.01) |
| *H04L 12/28* | (2006.01) |
| *H04L 12/825* | (2013.01) |
| *H04W 80/06* | (2009.01) |
| *H04W 28/02* | (2009.01) |

(Continued)

(52) U.S. Cl.
CPC .............. *H04L 47/25* (2013.01); *H04L 47/14* (2013.01); *H04L 47/2408* (2013.01); *H04L 47/29* (2013.01); *H04L 47/30* (2013.01); *H04L 69/16* (2013.01); *H04W 28/0273* (2013.01); *H04W 80/06* (2013.01); *H04W 88/18* (2013.01)

(58) Field of Classification Search
CPC ......... H04L 47/25; H04L 47/14; H04L 47/30; H04L 47/2408; H04L 47/29; H04L 12/28; H04L 47/10; H04L 49/90; H04W 80/04
See application file for complete search history.

(56) References Cited

U.S. PATENT DOCUMENTS

| 8,379,515 | B1 | 2/2013 | Mukerji |
| 2008/0192710 | A1* | 8/2008 | Balachandran ......... H04L 47/10 370/338 |

(Continued)

OTHER PUBLICATIONS

International Search Report and Written Opinion dated Jul. 29, 2014, in International Application No. PCT/SE2014/050358, 13 pages.

(Continued)

*Primary Examiner* — Andrew Lee
(74) *Attorney, Agent, or Firm* — Rothwell, Figg, Ernst & Manbeck, P.C.

(57) ABSTRACT

A first network node, for supporting transport of data in a wireless communication network. One or more first data transmission connections, for first data flows, are established between the first network node and one or more service providing entities. One or more second data transmission connections, for second data flows associated with the first data flows, are established between the first network node and one or more wireless terminals via a target node. The first network node obtains a buffer measure that is indicative of a buffering degree at the target node for a first group of the second data flows. The first network node controls, based on the obtained buffer measure, a transmission pace between the first network node and the target node for a second group of the second data flows.

26 Claims, 9 Drawing Sheets

(51) Int. Cl.
    *H04L 12/835*     (2013.01)
    *H04L 12/801*     (2013.01)
    *H04L 12/851*     (2013.01)
    *H04L 29/06*     (2006.01)
    *H04W 88/18*     (2009.01)

(56) References Cited

U.S. PATENT DOCUMENTS

| | | | |
|---|---|---|---|
| 2009/0201813 A1 | 8/2009 | Speight | |
| 2010/0220604 A1* | 9/2010 | Skog | H04L 29/06027 370/252 |
| 2012/0140633 A1* | 6/2012 | Stanwood | H04L 47/2458 370/235 |
| 2012/0155264 A1* | 6/2012 | Sharma | H04L 43/0852 370/232 |
| 2012/0290727 A1 | 11/2012 | Tivig | |
| 2013/0013791 A1 | 1/2013 | Kotecha et al. | |
| 2013/0042015 A1* | 2/2013 | Begen | H04N 19/46 709/231 |
| 2014/0189036 A1* | 7/2014 | Bhatia | H04L 67/322 709/213 |
| 2014/0317241 A1* | 10/2014 | Zhao | H04L 65/608 709/219 |
| 2014/0325023 A1* | 10/2014 | Caulfield | H04L 65/4084 709/219 |

OTHER PUBLICATIONS

Supplementary European Search Report dated May 2, 2016, in European Application No. 14803997, 2 pages.

\* cited by examiner

NETWORK NODE FOR CONTROLLING TRANSPORT OF DATA IN A WIRELESS COMMUNICATION NETWORK

CROSS REFERENCE TO RELATED APPLICATION(S)

This application is a 35 U.S.C. §371 National Phase Entry Application from PCT/SE2014/050358, filed Mar. 24, 2014, designating the United States, and also claims the benefit of U.S. Provisional Application No. 61/829,315, filed May 31, 2013. The disclosures of both applications are incorporated herein in their entirety by reference.

TECHNICAL FIELD

Embodiments herein relate to a method performed by a first network node and the first network node, such as a Multi Service Proxy node, comprised in a wireless communication network, such as a telecommunication network. In particular, embodiments herein relate to supporting transport of data in the wireless communication network.

BACKGROUND

Communication devices such as terminals are also known as e.g. User Equipments (UEs), mobile terminals, wireless terminals and mobile stations. Terminals are enabled to communicate wirelessly in a cellular communication network, wireless communication network or wireless communications system, sometimes also referred to as a cellular radio system or a cellular network. The communication may be performed, e.g., between two terminals, between a terminal and a regular telephone and/or between a terminal and a server via a Radio Access Network (RAN), and possibly one or more core networks, comprised within the cellular communication network.

Terminals may further be referred to as mobile telephones, cellular telephones, laptops, or tablet computer with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, wherein each cell area being served by an access node such as a base station, e.g., a Radio Base Station (RBS), which sometimes may be referred to as e.g. "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) is used for the transmission path, or send direction, from the base station to the mobile station. The expression Uplink (UL) is used for the transmission path, or send direction, in the opposite direction, i.e. from the mobile station to the base station.

Wireless communication networks comprise network nodes that may include so called proxies. Proxies are involved in transport between UEs and service providing entities, such as servers, that may be located inside or outside the wireless communication network. With regard to transport between proxies and UEs and, to some extent, also between proxies and servers one problem is to maximise throughput and at the same time minimise delay. These requirements are partly in conflict with each other. In terms of Transmission Control Protocol (TCP), the dominating transport protocol, maximum throughput suggests large window sizes whereas minimum delay suggests small window sizes. A common solution to this type of problem is to tweak TCP in terms of algorithms, such as Reno, YeAH, Low Extra Delay Background Transport (LEDBAT) etc. and parameters, such as the initial window size, allocated buffer space, etc.

While this approach may work, it also has a number of problems. For example, different services and different conditions may require different solutions, which results in maintenance and tuning per version and/or parameter, not only in a limited number of isolated cases but also in an almost infinite space of combined cases.

SUMMARY

In view of the above, an object of embodiments herein is to provide, or at least enable, improved transport functionality in a wireless communication network of the above mentioned kind.

According to a first aspect of embodiments herein, the object is achieved by a method, performed by a first network node, for supporting transport of data in a wireless communication network. The first network node and a target node are comprised in the wireless communication network. The transport of data is based on one or more first data transmission connections for transmission of one or more first data flows, which one or more first data transmission connections are established between the first network node and one or more service providing entities. The transport of data is further based on one or more second data transmission connections for transport of one or more second data flows, which one or more second data transmission connections are established between the first network node and one or more wireless terminals via the target node. The one or more second data flows are associated with the one or more first data flows. The first network node obtains a buffer measure that is indicative of a buffering degree at the target node for a first group of the one or more second data flows. The first network node controls, based on the obtained buffer measure, a transmission pace between the first network node and the target node for a second group of the one or more second data flows.

According to a second aspect of embodiments herein, the object is achieved by a computer program that when executed by a processor causes the first network node to perform the method according to the first aspect.

According to a third aspect of embodiments herein, the object is achieved by a computer program product, comprising a computer readable medium and the computer program according to second aspect stored on the computer readable medium.

According to a fourth aspect of embodiments herein, the object is achieved by a first network node for supporting transport of data in a wireless communication network. The wireless communication network comprises the first network node and a target node. The transport of data is based on one or more first data transmission connections for transmission of one or more first data flows, which one or more first data transmission connections are established between the first network node and one or more service providing entities. The transport of data is further based on one or more second data transmission connections for transport of one or more second data flows, which one or more second data transmission connections are established between the first network node and one or more wireless terminals via the target node. The one or more second data flows are associated with the one or more first data flows. The first network node is configured to obtain a buffer measure that is indicative of a buffering degree at the target node for a first group of the one or more second data flows. The first network node is further configured to control, based on the obtained buffer measure, a transmission pace between the first network node and the target node for a second group of the one or more second data flows.

In the above context, said control, based on the obtained buffer measure, of the transmission pace between the first network node and the target node for the second group of the one or more second data flows, enable the first network node to control and tune performance per-bearer, per wireless terminal (i.e. per user), per-destination (e.g. per cell), and/or per-service. The first network node may thereby control and tune performance for the second group of flows, e.g. for all flows to or from a particular wireless terminal, which flows have the target node as a common bottleneck in transport of data to and/or from this wireless terminal. This is in contrast to conventional only per-flow tuning. As a result, negative impact from the target node as bottleneck in the transport of data may be reduced, e.g. reduction of delay, such as latency, that else would result. Transmission rates per flow may at the same time be controlled to increase throughput of the transport of data.

BRIEF DESCRIPTION OF THE DRAWINGS

Examples of embodiments herein are described in more detail with reference to the appended schematic drawings.

DETAILED DESCRIPTION

Before presenting embodiments herein and as part of the development towards embodiments herein, the situation and problem indicated in the Background will be further discussed.

A further disadvantage that has been identified to be associated with the approach discussed in the Background is that it maintains a per-flow view and does not take advantage of the fact that proxies may take a per-bearer, per-user or per-destination view which provides richer opportunities for optimization. Moreover, TCP is in some aspects a bad match for requirements in wireless communication networks: TCP is built for networks in which losses are frequent and the transmission capacities and round trip times are unknown while wireless communication networks typically exhibit few losses and known (or bounded) transmission capacities and round trip times.

Embodiments herein, as explained in the following, relate to supporting transport of data in a communication network, e.g. a wireless communication network, in particular over TCP connections.

Figure 1:
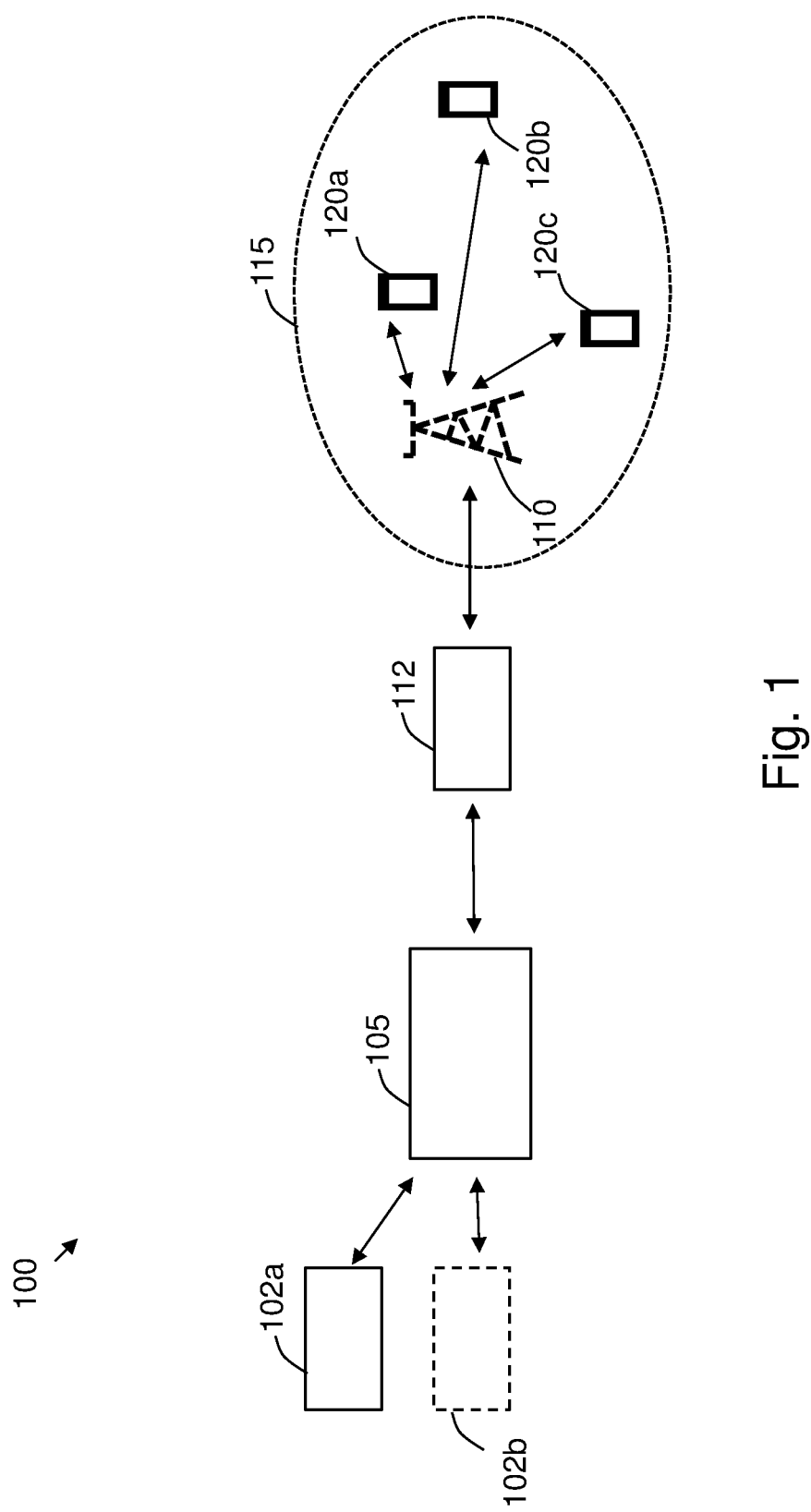
FIG. 1 is a schematic block diagram schematically depicting an example of a wireless communication network in which embodiments herein may be implemented.

FIG. 1 is a schematic block diagram schematically depicting an example of a wireless communication network 100, in which embodiments herein may be implemented. The wireless communication network 100 may e.g. be an LTE, WCDMA, GSM network, any 3GPP cellular network, W-Fi, Worldwide Interoperability for Microwave Access (Wi-MAX), or any cellular network or system. Wi-Fi refers to any Wireless Local Area Network (WLAN) based on the Institute of Electrical and Electronics Engineers' (IEEE) 802.11 standards.

The communication network 100 comprises a first network node 105 that may be referred to as and/or correspond to a proxy node or a node that may be referred to as comprising and/or comprise proxy related functionality. The first network node 105 may correspond to what herein is referred to by Multi Service Proxy (MSP). The wireless communications network 100 further comprises a second network node 110 that may be a transmission point such as a radio base station, or simply base station, for example an eNB, an eNodeB, or an Home Node B, an Home eNodeB or any other network node capable to serve a terminal, e.g. a wireless terminal, in a wireless communication network. The second network node 110 may correspond to what herein and in the drawings is referred to by "NB" and/or "eNB".

One or more wireless terminals 120a-c are located in the wireless communication network 100 and may be served by the second network node 110 in an area 115, e.g. a cell where the second network node 110 provides radio coverage. The area 115 may correspond to what herein is referred to by "destination". Just to mention some examples, the one or more terminals 120a-c may correspond to or comprise what typically is referred to by a wireless device, user equipment, a mobile terminal or a wireless terminal, a mobile phone, a computer such as e.g. a desktop computer, a laptop, a Personal Digital Assistant (PDA) or a tablet computer, with wireless capability, or any other radio network units capable to communicate over a radio link in a wireless communications network. Please note the term user equipment as used herein, and thus also the wireless terminals 120a-c, also covers Machine to Machine (M2M) devices, even though they do not have any user. One or more wireless terminals, "UE" and/or "receiver" as used herein may e.g. refer to any of the one or more wireless terminals 120a-c.

The communication network 100 further comprise a target node 112 through which data transmission and thus transport of data, between the first network node 105 and the second network node 110 takes part. The target node 112 may be regarded as a "bottleneck" node and may fully or partly correspond to what herein is referred to by "bottleneck". In some typical embodiments the target node 112 and the second network node 110 are the same network node. In other embodiments the target node 112 may be another network node in the wireless communication network 100, which other network node is considered a "bottleneck" regarding transport of data, i.e. data transport, in the wireless communication network 100, in particular regarding throughput and/or delay. By "bottleneck" node in this context should be understood to be meant a node at which capacity or performance of data transport is limited. As should be realized, in particular from the present disclosure as a whole, "target" in target node 112 refers to that embodiments herein target to alleviate or solve problems relating to the target node 112, such as problems relating to the target node being or risk being a bottleneck in the data transport. In a typical example the target node 112 is a network node in the Radio Access Network (RAN) of the wireless communication network, e.g. a so called radio network node. For example, the target node 112 and the second network node 110 may be one and the same node being a radio network node, e.g. a base station, such as an eNB or NB.

Moreover, the figure depicts one or more service providing entities 102a-b, such as servers, that may be comprised in but typically are located outside the communication network 100 as such. Any of the one or more service providing entities may correspond to what herein is referred to by "server". The one or more service providing entities 102a-b may be at least partly comprised in another communication network and accessible over the Internet and/or may at least partly be comprised in a core network of the wireless communication network 100.

Attention is drawn to that FIG. 1 is only schematic and for exemplifying purpose and that not everything shown in the figure is required for all embodiments herein, as will be evident from the below. Also, a wireless communication network that in reality corresponds to the wireless communication network 100 typically comprises several further network nodes, base stations, cells etc., as realized by the skilled person, but which are not shown herein for simplicity.

Figure 2:
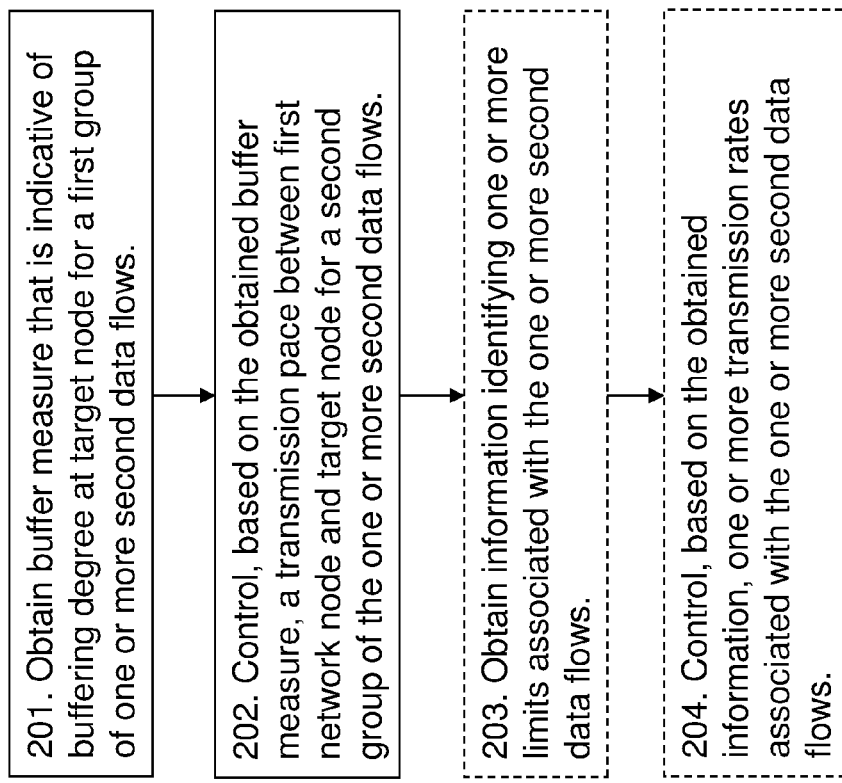
FIG. 2 is a flow chart illustrating a method, performed by a first network node, according to embodiments herein.

In FIG. 2, embodiments of a method, performed by the first network node 105, for supporting transport of data in the wireless communication network 100, are schematically depicted. As already mentioned, the first network node 105 and the target node 112 are comprised in the wireless communication network 100.

Said transport of data is based on one or more first data transmission connections, such as first TCP connections, for transmission of one or more first data flows, e.g. first TCP flows. The one or more first data transmission connections are established between the first network node 105 and the one or more service providing entities 102a-b. The one or more first data transmission connections may correspond to what herein is referred to by "TCP" or "ordinary TCP connection". Note that data transmission connections and data flows may be at different levels in a protocol stack and need not both be at e.g. a transport level as in the case of TCP.

Said transport of data is further based on one or more second data transmission connections, such as second TCP connections, for transport of one or more second data flows, e.g. second TCP flows. The one or more second data transmission connections are established between the first network node 105 and one or more wireless terminals 120a-c via the target node 112. The one or more second data flows are associated with the one or more first data flows, e.g. by comprising data received therefrom. The one or more second data flows may thus be based on the one or more first data flows. The one or more second data transmission connections may correspond to what elsewhere herein is referred to by "TCP Push" and/or "TCP Backhaul Transport" ("TCP BHT").

The method comprises the following actions, which actions may be taken in any suitable order. Also, the actions may be carried out fully or partly overlapping in time.

Action 201

The first network node 105 obtains a buffer measure that is indicative of a buffering degree at the target node 112 for a first group of the one or more second data flows. A buffer associated with the buffering degree may correspond to what elsewhere herein is referred to by e.g. "NB buffer", "base station buffer" or "buffer at the base station".

The buffer measure may be obtained by monitoring one or more, or even all, of the second data transmission connections and/or, in some embodiments, obtaining the buffer measure comprises receiving at least part of the buffer measure from another network node, e.g. the target node 112.

Action 202

The first network node 105 controls, based on the obtained buffer measure, a transmission pace between the first network node 105 and the target node 112 for a second group of the one or more second data flows.

In some embodiments, the first group and/or the second group comprise only and/or all second data flows associated with one and the same terminal, e.g. the terminal 120*a*.

In some embodiments, the first group and/or the second group comprise only and/or all second data flows associated with the area 115 in which the one or more wireless terminals 120*a*-*c* are served by the second network node 110.

In some embodiments, the first group and/or the second group comprises only and/or all data flows associated with one and the same bearer of data. The term "bearer" as used herein is further exemplified and discussed below.

The first and second group may, or may not, be the same group. For example, the first group may be a group of flows known to be indicative for the second group so that the buffering degree is valid also for the second group.

In some embodiments, the transmission pace is controlled to decrease a delay indicated by the buffer measure.

In some embodiments, the transmission pace is controlled to keep the buffering degree at the target node at a non-empty level, preferably as small as possible. The transmission pace may be controlled to keep the buffering degree below a predetermined level and/or as small as allowed by operational circumstances.

In some embodiments, the transmission pace is further controlled based on awareness of service type associated with at least one of the one or more first data flows.

The first network node may e.g. be aware of the service type based on type of the one or more first connections and/or by inspecting the one or more first data flows and/or the one or more second data flows. As explained below in context of more detailed examples, the transmission pace may be controlled so that certain services are prioritized, e.g. by applying weighting or minimum rates.

The actions 201 and 202 may partly or fully correspond to what elsewhere herein may be referred to by or in the context of "TOP BHT" and/or "network rate control".

Action 203

The first network node 105 may obtain information identifying one or more limits associated with the one or more second data flows. The limit may e.g. identify a maximal receiving rate.

In some embodiments, the one or more limits are announced by and/or received from at least one terminal of the one or more wireless terminals 120*a*-*c*.

The information identifying the one or more limits may be information identifying one or more receiver or congestion windows associated with the one or more second data flows.

In some embodiments, the one or more transmission rates are controlled to maximise the one or more transmission rates without exceeding the one or more limits.

Action 204

The first network node 105 may control, based on the obtained information, one or more transmission rates associated with the one or more second data flows.

The actions 203 and 204 may partly or fully correspond to what elsewhere herein may be referred to by or in the context of "TCP Push" and/or "receiver rate control". In the context of the embodiments herein, said control, based on the obtained buffer measure, of the transmission pace between the first network node 105 and the target node 112 for the second group of the one or more second data flows, i.e. Actions 201-202, enable the first network node 105 to control and tune performance per-bearer, per wireless terminal (i.e. per user), per-destination (e.g. per cell), and/or per-service. The first network node 105 may thereby control and tune performance for the second group of flows, e.g. for all flows to or from a particular wireless terminal, which flows have the target node 112 as a common bottleneck in transport of data to and/or from this wireless terminal. This is in contrast to conventional only per-flow tuning. As a result, negative impact from the target node 112 as bottleneck in the transport of data may be reduced, e.g. reduction of delay, such as latency, that else would result.

Advantageously this is combined with the control of the transmission rates as in Actions 203-204, to, at the same time, increase throughput of the transport of data. Compared to conventional control, the combination supports shorter response times and higher throughput. The risk of getting empty buffers (resulting in poor throughput because of "missed possibilities" to send) is reduced at the same time as the risk of getting too full buffers (resulting in increased delay) is reduced.

In other words, embodiments herein enable a consistent and transparent way of tuning performance per-bearer, per-user or per-destination, and/or per-service to e.g. reduce or even minimize delay, and/or increase or even maximize throughput. Embodiments herein may take advantage of a per-bearer, per-user or per-destination knowledge instead of being limited to per-flow knowledge as conventionally is the case. This enables maximization of the rate of each flow without undesired competition with "ourselves". Self-competing may e.g. occur when two flows to one and the same wireless terminal share the target node as a bottleneck and compete about the same scare resource, e.g. bandwidth, of the bottleneck. Embodiments herein also make it possible to take advantage of the fact that there is less need to do complete probing in wireless communication networks than on the Internet in general by allowing for simplifications of procedures like retransmissions and interruptions.

Embodiments herein are relevant for implementation in e.g. a TCP proxy or network node comprising such or similar functionality, and makes it possible to combine high, or even full, speed with low delay. To this end it may be provided one real TCP connection per flow between proxies and UEs, which may be tuned to maximize its speed, and a common "virtual" TCP connection for real connections, e.g. per bearer and/or user, and/or per bottleneck, which may be tuned to low latency. The common "virtual" TCP connection may be regarded as an implicit and intelligent tunnel which minimises delays over all, or a group of, flows, e.g. all flows to a particular wireless terminal, which flows have the target node 112 as a common bottleneck. Embodiments herein also enable (i) controlled and tuneable bandwidth sharing on a bearer, (ii) speed up of possible retransmissions, (iii) ease of the load associated with handovers, and (iv) reduction of waste represented by unwanted data.

Figure 3:
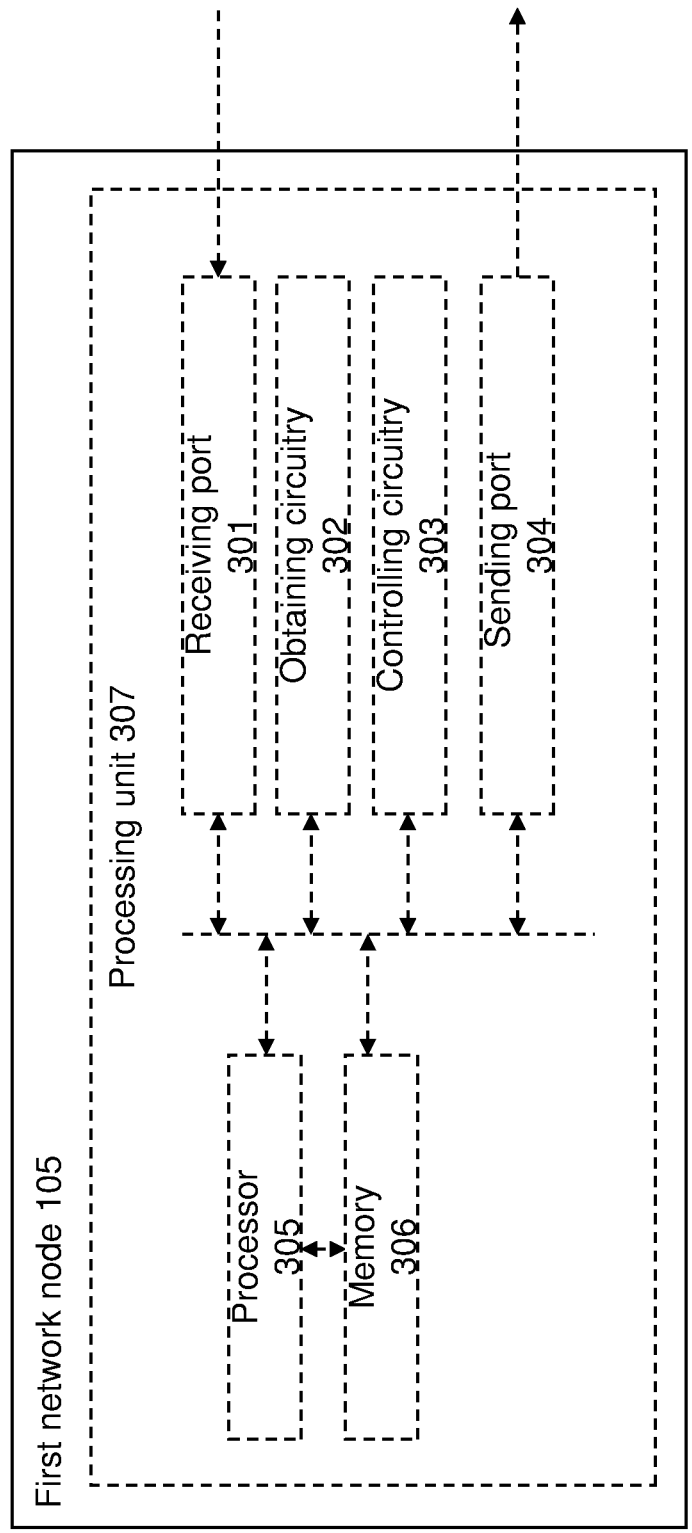
FIG. 3 is a schematic block diagram illustrating a first network node according to embodiments herein.

To perform the actions 201-207, for supporting transport of data in the wireless communication network 100, the first network node 105 may comprise an arrangement schematically depicted in FIG. 3.

The first network node 105, or a receiving port 301 comprised in the first network node 105, may in general be configured to receive information from one or more other network nodes, e.g. be configured to receive the one or more first data flows from the one or more service providing entities 102*a*-*b*, and/or e.g. be configured to receive at least part of the buffer measure from another network node, e.g. the target node 112.

The first network node 105, or a obtaining circuitry 302 comprised in the first network node 105, is configured to obtain the buffer measure that is indicative of the buffering degree at the target node 112 for the first group of the one or more second data flows. The first network node 105, or the obtaining circuitry 302, may be further configured to obtain the information identifying the one or more limits associated with the one or more second data flows.

The first network node 105, or a controlling circuitry 303 comprised in the first network node 105, is configured to control, based on the obtained buffer measure, the transmission pace between the first network node 105 and the target node 112 for the second group of the one or more second data flows. The first network node 105, or the controlling circuitry 303, may be further configured to control, based on the obtained information, the one or more transmission rates associated with the one or more second data flows.

The first network node 105, or a sending port 304 comprised in the first network node 105, may in general be configured to send information to one or more other network nodes, e.g. be configured to send the one or more second data flows to the one or more wireless terminals 120a-c via the target node 112.

The embodiments of the first network node 105 may be fully or partly implemented through one or more processors, such as a processor 305 depicted in FIG. 3. In some embodiments the circuitry and ports discussed above may be fully or partially implemented by the processor 305. The first network node 105 may further comprise a memory 306, depicted in FIG. 3, comprising one or more memory units. The memory 306 is arranged to store data, such as configurations and/or applications involved in or for performing the functions and actions of embodiments herein.

In some embodiments, illustrated with support from the schematic drawings in FIGS. 9a-c, further explained separately below, there is provided a computer program 901 comprising instructions that when executed by the first network node 105, e.g. a processor comprised therein, such as the processor 305, causes the first network node 105 to perform the method according to embodiments herein as described above. The memory 306 may store the computer program 901.

Figure 9B:
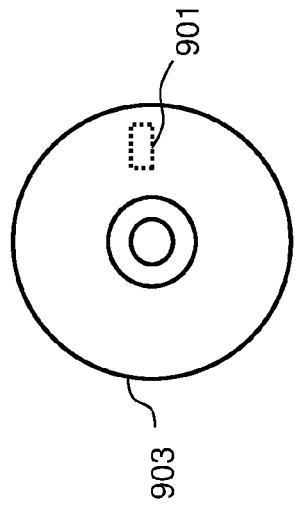
FIG. 9a-c are schematic drawings for illustrating embodiments relating to computer program embodiments regarding the first network node.
Figure 9A:
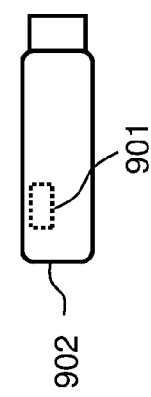
Figure 9C:
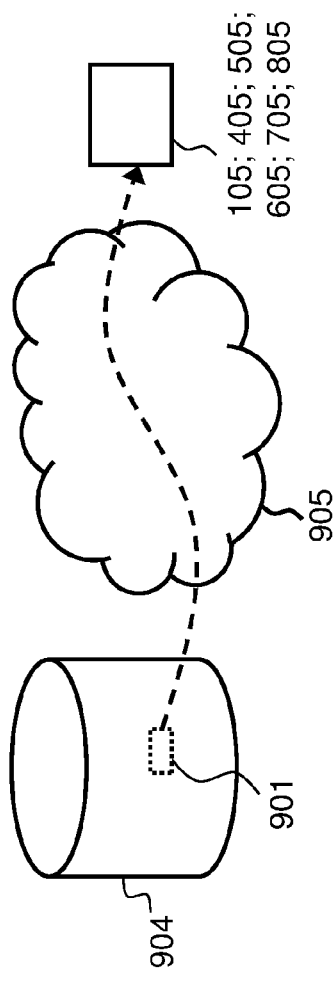

In some embodiments, also illustrated with support from the schematic drawings in FIGS. 9a-c, there is provided a computer program product comprising a computer-readable medium, i.e. a data carrier, and the computer program 901 stored on the computer-readable medium. By computer readable medium it is excluded a transitory, propagating signal and the computer readable medium may correspondingly be named non-transitory computer readable medium. Non-limiting examples of the computer-readable medium is a memory card or a memory stick 902 as in FIG. 9a, a disc storage medium 903 such as a CD or DVD as in FIG. 9b, a mass storage device 904 as in FIG. 9c. The mass storage device 904 is typically based on hard drive(s) or Solid State Drive(s) (SSD). The mass storage device 904 may be such that is used for storing data accessible over a computer network 905, e.g. the Internet or a Local Area Network (LAN).

The computer program 901 may furthermore be provided as a pure computer program or comprised in a file or files. The file or files may be stored on the computer-readable memory and e.g. available through download e.g. over the computer network 905, such as from the mass storage device 904 via a server. The server may e.g. be a web or file transfer protocol (ftp) server. The file or files may e.g. be executable files for direct or indirect download to and execution on the first network node 105, e.g. on the processor 305, or may be for intermediate download and compilation involving the same or another processor to make them executable before further download and execution.

Those skilled in the art will also appreciate that the ports and circuitry 301-304 may refer to a combination of analogue and digital circuits, and/or one or more processors configured with software and/or firmware (e.g., stored in memory) that, when executed by the one or more processors such as the processor 305, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

As a further example, the first network node 105 may comprise a processing unit 307, which may comprise one or more of the circuit(s) and/or port(s) etc. mentioned above. As used herein, the term "processing circuit" may relate to a processing unit, a processor, an application specific integrated circuit (ASIC), a field-programmable gate array (FPGA) or the like. As an example, a processor, an ASIC, an FPGA or the like may comprise one or more processor kernels. In some examples, the processing circuit may be embodied by a software and/or hardware module.

In the following, embodiments herein will be illustrated in more detail by a number of examples and exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 4:
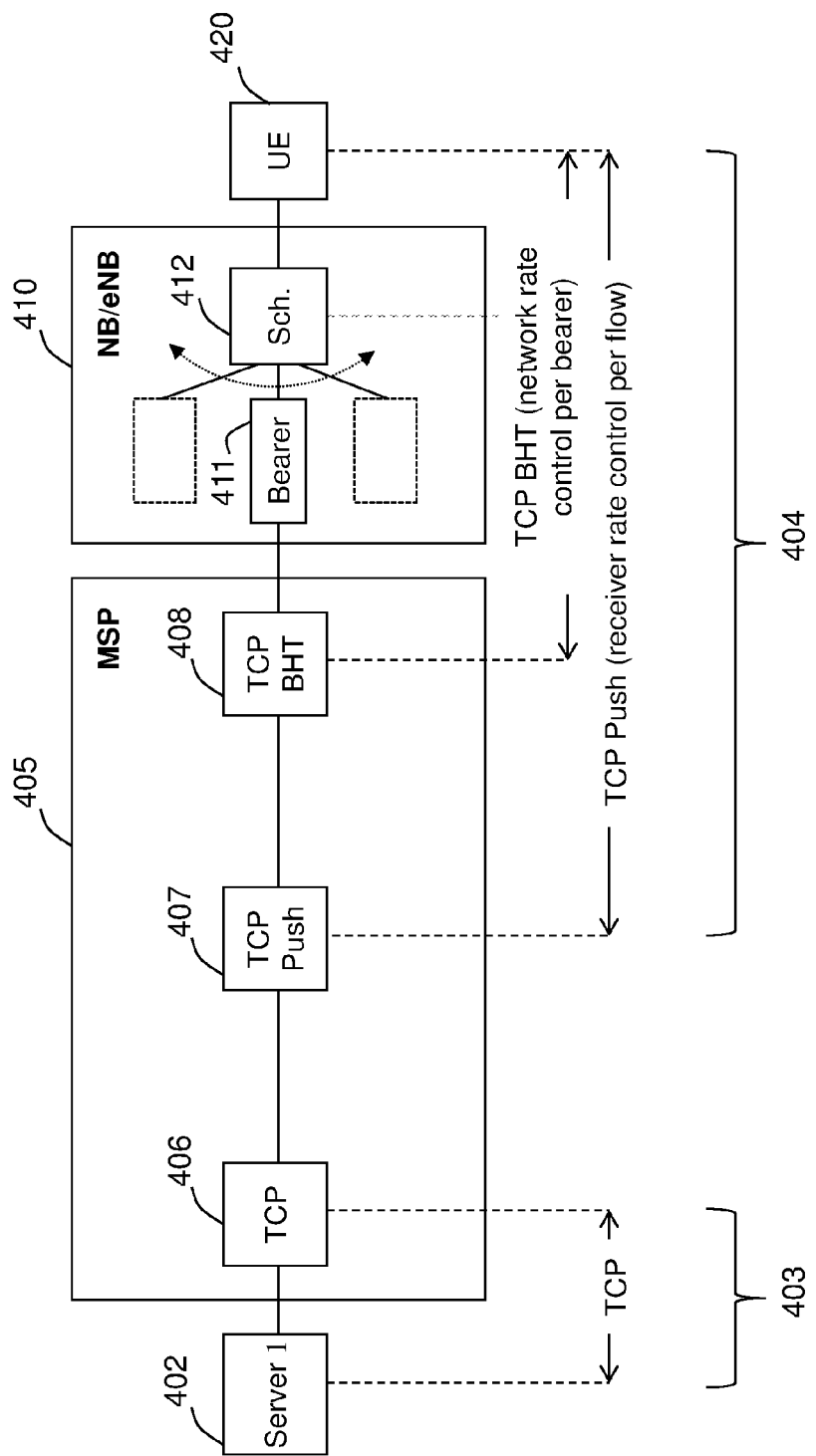
FIG. 4 schematically shows an overview of a system according to a first example for exemplifying embodiments herein.

FIG. 4 schematically shows an overview of a system according to a first example for exemplifying embodiments herein. An arbitrary UE 420 (right) is consuming content from an arbitrary first server 402 (left). The UE 420 may correspond to any one of the wireless terminals 120a-c and the first server 402 may correspond to the service providing entity 102a. To this end, a MSP 410 has set up a first TCP connection 403 (named "TCP" in the figure) between itself and the first server 402, and another second TCP connection 404 between itself and the UE 420, which runs over a bearer 411, via a base station 410 that may be a NB or eNB as indicated in the figure. The base station 410 may fully or partly correspond to the second network node 110 and the target node 112. The MSP 405 may fully or partly correspond to the first network node 105. The first TCP connection 403 may fully or partly correspond to one of the first data transmission connections mentioned above in connection with FIG. 2. The second TCP connection 404 may fully partly correspond to one of the second data transmission connections mentioned above in connection with FIG. 2. The bearer 411 is shown comprised in a base station 410. The base station 410 is further shown comprising a scheduler 412. The arrow at the scheduler 412 in combination with the bearer 411 and the no-named, dashed, "bearer"-boxes above and below the bearer 411, schematically illustrate how the scheduler 412 may schedule data from different bearers. Note that the shown location of the bearers, e.g. the bearer 411, in the base station 410 is for illustration purpose only since, as should be recognized by the skilled person, a bearer not only pertains to a specific node.

The first TCP connection 403, between the MSP 410 and the first server 402, is an ordinary TCP connection involving ordinary TCP functionality 406 in the MSP 405, whereas the second TCP connection 404, between the MSP 405 and the UE 420, is a modified TCP connection, the functionality of which is split into a receiver rate control ("TCP Push") functionality part 407 and a network rate control ("TCP BHT") functionality part 408. The "TCP Push" functionality part 407 and "TCP BHT" functionality part 408, and corresponding parts in examples below, may e.g. be implemented as functions and/or agents.

The "TCP Push" functionality part 407 is performed per flow and aims at maximising the rate. In terms of conventional TCP, this part may essentially keep the so called congestion window at a maximum size advertised by the receiver (in the example the UE 420) as long as there is data to send. The "TCP BHT" functionality part 408 is performed per bearer and/or user and/or destination and aims at minimising the delay. In terms of conventional TCP this part may essentially keep a minimal buffer at the base station 410.

The two parts 407, 408 ("TCP Push" and "TCP BHT") may be viewed as relating to separate TCP connections, an explicit, real one, called "TCP Push" connection, which controls receiver congestion per flow, and an implicit, virtual one, called "TCP BHT" connection, which controls network congestion per bearer and/or user and/or destination. The real connection, "TCP Push", sends and receives all packets over the second TCP connection 404, e.g. from the initial SYN/ACK to the final FIN/ACK of the second TCP connection 404. The virtual connection, "TCP BHT", paces transmissions (e.g. from all real connections in progress on a bearer) to e.g. fit the radio network (that the base station 110 is part of) based on estimates obtained from e.g. monitoring transmitted and acknowledged data from all real connections in progress on a bearer and/or with respect to a user and/or destination.

The pacing may be tuned to keep a minimal non-empty buffer at the base station 110, or at some other bottleneck, since, on the one hand, too large (bloated) buffers tend to cause (i) queuing delay when new flows are started on top of existing ones, (ii) transmission overhead when flows must re-routed between base stations due to handovers and (iii) bandwidth wastage when flows are interrupted by users due to lack of interest and/or patience while, on the other hand, too short (empty) buffers tend to reduce throughput both for the user and the system. The "TCP BHT" functionality part 408, e.g. for accomplishing the pacing based on the buffer, may fully or partly correspond to Actions 201 and 202 described above. The "TCP Push" functionality part 407 may fully or partly correspond to Action 203 and 204 described above.

Figure 5:
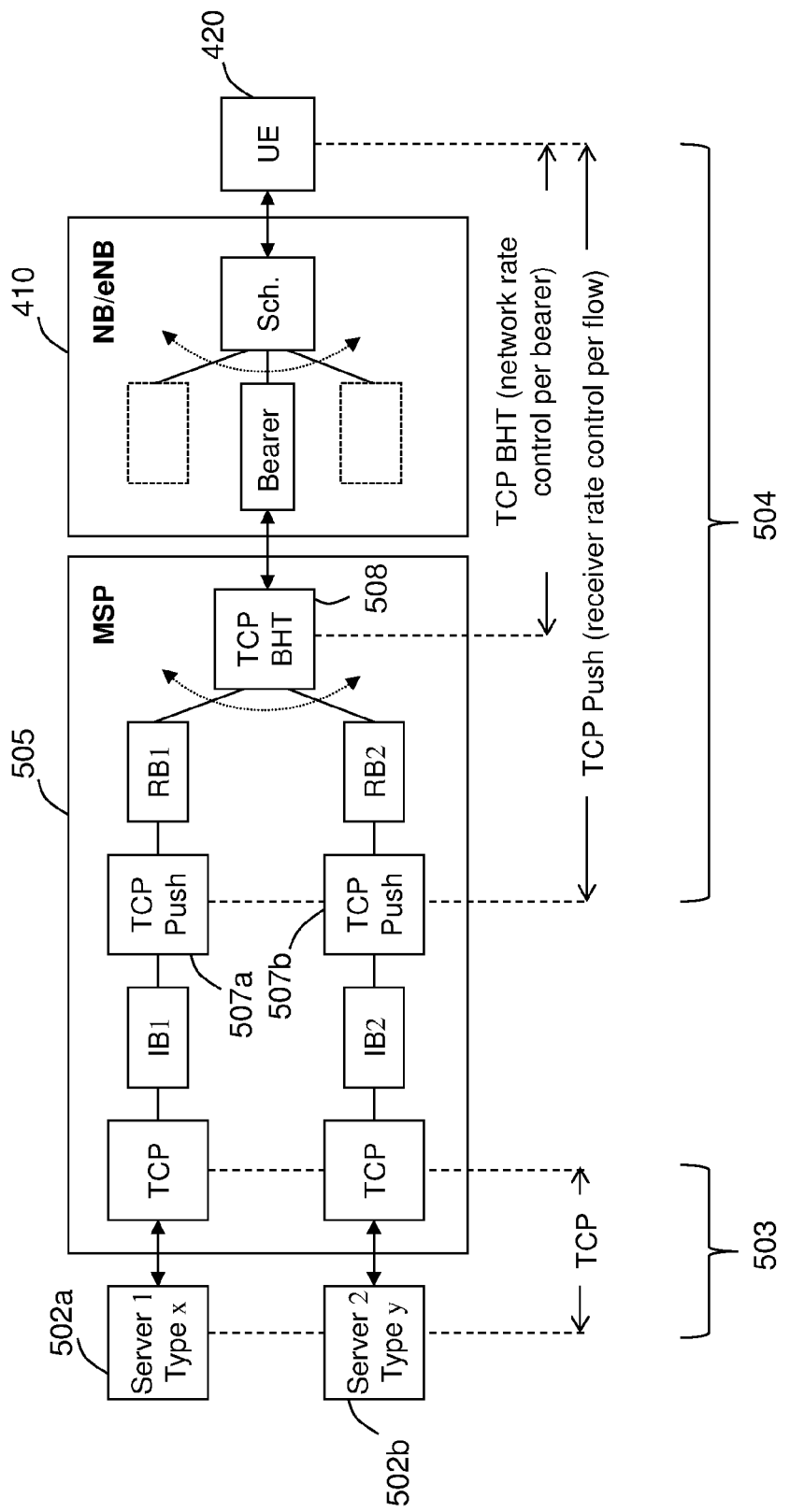
FIG. 5 schematically shows a more detailed view of a system according to a second example for exemplifying embodiments herein.

FIG. 5 schematically shows another, somewhat more detailed view of a system according to a second example for exemplifying embodiments herein. Note that focus in the present example is on differences compared to the first example and FIG. 4. Information relating to similarities has been left out to avoid unnecessary repetition. In the present example, the UE 420 is consuming two different types of content, namely content x, e.g., web pages, and content y, e.g., streaming media, which are provided from two different servers 502a-b (left), respectively. The servers 502a-b may correspond to the service providing entities 102a-b. A MSP 505 has in the present example set up two ordinary first TCP connections 503 between itself and the servers 502a-b and two second TCP connections 504 with split functionality (illustrated by two "TCP Push" functionality parts 507a-b and one "TCP BHT" functionality part 508) between itself and the UE 420 over one and a same bearer. As in the first example of FIG. 4, the MSP 505 may fully or partly correspond to the first network node 105, the first TCP connections 503 may fully or partly correspond to one of the first data transmission connections mentioned above in connection with FIG. 2, and the second TCP connections 504 may fully partly correspond to one of the second data transmission connections mentioned above in connection with FIG. 2.

Two TCP connections, corresponding to the "TCP Push" parts of the second TCP connections 504, may be set up. The "TCP BHT" part of the second TCP connections 504 may then be accomplished by a set of rules regarding how to control said two TCP connections corresponding to the "TCP Push" parts on said one and the same bearer.

The figure illustrates that ordinary TCP flows of the first TCP connections 503 fetch data from said different servers 502a-b and store the result in Intermediate Buffers (IBs, named IB1 and IB2 in the figure) while split TCP flows of the second TCP connections 504 maintain two Read-y Buffers (RBs, named RB1 and RB2 in the figure). Arrivals to the RBs are controlled by the receiver congestion window (per source flow) using the "TCP Push" functionality parts 506a-b and departures from the RBs are controlled by an estimated buffer of the base station 410 (per bearer and/or user and/or destination) using the "TCP BHT" functionality part 508.

The two "TCP Push" parts of the second TCP connections 504 may open and close independently with SYN/ACK and FIN/ACK respectively, and maximise throughput per connection by constantly keeping a maximum number of packets in transit. The "TCP BHT" parts of the second TCP connections 504 may be regarded as opened (and/or closed) by a first (and/or last) SYN/ACK (and/or FIN/ACK) related to said one and the same bearer and/or UE 420, and/or any bottleneck such as an intermediate router in a backhaul network, i.e. a network connecting e.g. the base station 410 to a core network (not shown). The "TCP BHT" functionality part 508 minimises delay over all connections it controls by scheduling transmissions from the RBs to the base station 410 such that, out of all packets sent by the "TCP Push" functionality parts 507a-b, only a few are in actual transit (en route or in the base station 110 or any other bottleneck) while the others are kept in the RBs (RB1 and RB2) of the MSP 505. The amount of data in transit may be set as, e.g., a bandwidth-delay product where both (maximum) bandwidth and (maximum) delay may be technology dependent and measured or pre-set.

It should be noted, however, that instead of a fixed congestion window, in some embodiments the congestion window may vary and, for example, different well known TCP concepts, such as slow start and congestion avoidance, may be used and these may be controlled based on loss, delay etc. Note that even in this case, congestion control may be performed per bottleneck and hence flows do not compete with each other through TCP (which, at best, is partially controllable) but through the way in which the RBs are polled (which is fully controllable).

It may also be noted that the ordinary TCP connections may run independently (and thus transfer all content to the IBs as fast as permitted by the servers 502a-b and any intermediate network) and/or in a controlled way (and thus, e.g., transfer content so that the IBs never run empty). In the latter case the control may be executed by the "TCP Push" functionality parts 506a-b themselves by monitoring their IBs, or by any other agent and/or function.

Figure 6:
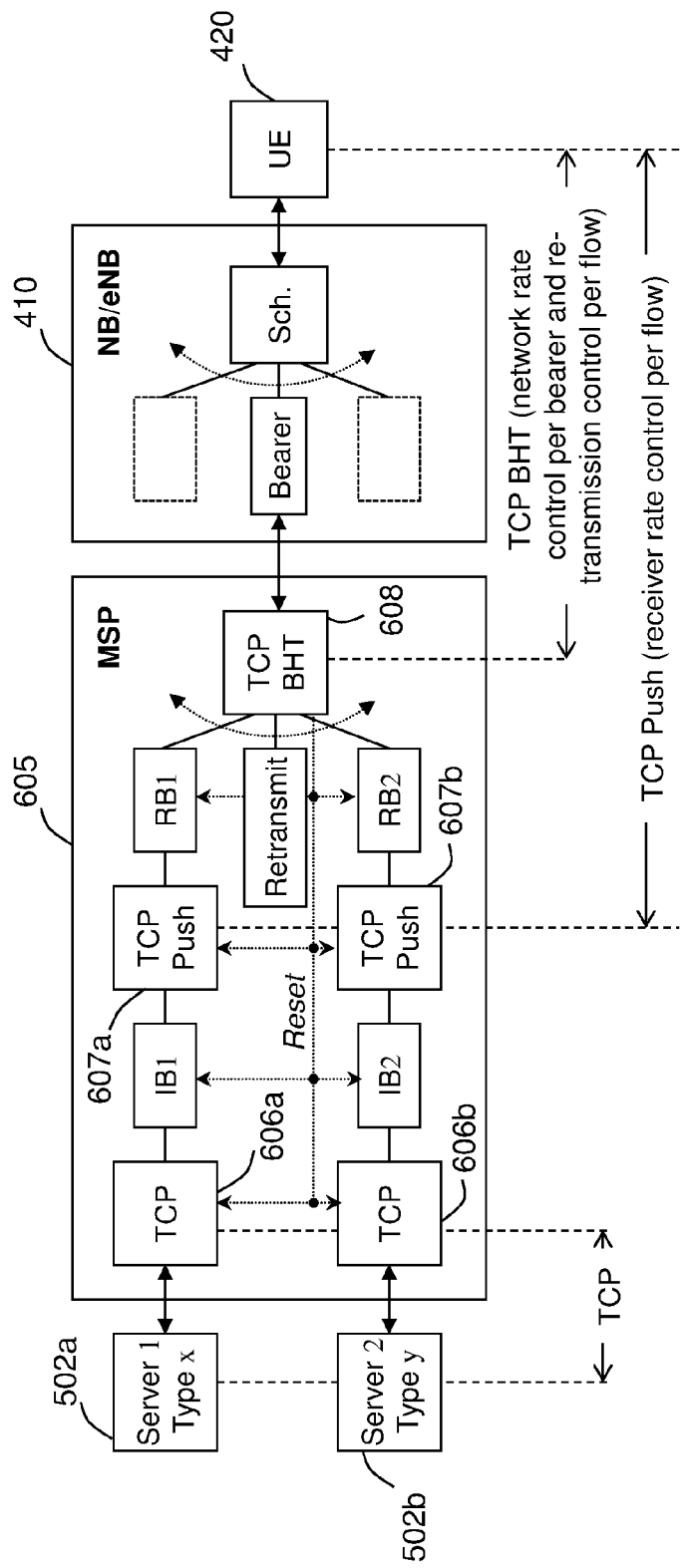
FIG. 6 schematically shows a more detailed view of a system according to a third example for exemplifying embodiments herein.

FIG. 6 schematically shows another more detailed view of a system according to a third example for exemplifying embodiments herein with improved support for retransmissions and resets, e.g. caused by user cancellations. Note that focus in the present example is on differences compared to the above described examples relating to FIGS. 4-5. Information relating to similarities has been left out to avoid unnecessary repetition. In FIG. 6 it has been added improved support in a MSP 605 for resets and retransmissions by moving some functionality from, per-flow, "TCP Push" functionality parts 607a-b to a per-bearer and/or per user, "TCP BHT" functionality part 608. To the first point, it may be noted that possible user-initiated resets (e.g. reload, forward, backward, closure etc.) may waste resources if handled in a conventional manner by TCP agents, since TCP agents facing the servers 502a-b, e.g. ordinary TCP functionalities 606a-b in the figure, will not be made aware of such actions and TCP agents facing the UE 420 (e.g. the "TCP Push" functionality parts 607a-b and the "TCP BHT" functionality part 608) typically will have a lot of data in the pipe. Hence it may be preferred to let the "TCP BHT" functionality part 608, that may be implemented as an agent, immediately stop the "TCP Push" functionality parts 607a-b, that also may be implemented as agents, and also any conventional TCP functionality, e.g. the ordinary TCP functionalities 606a-b, towards the servers 502a-b, and flush their buffers (i.e. the IBs and RBs).

To the second point, it may be noted that possible retransmissions may take a long time if handled in a conventional manner by the "TCP Push" functionality parts 607a-b since the RBs typically contain data up to almost an entire receiver window. Hence it may be preferred to let the (virtual) "TCP BHT" functionality part handle these since it can maintain a retransmission RB which may be polled with high or absolute priority.

Figure 7:
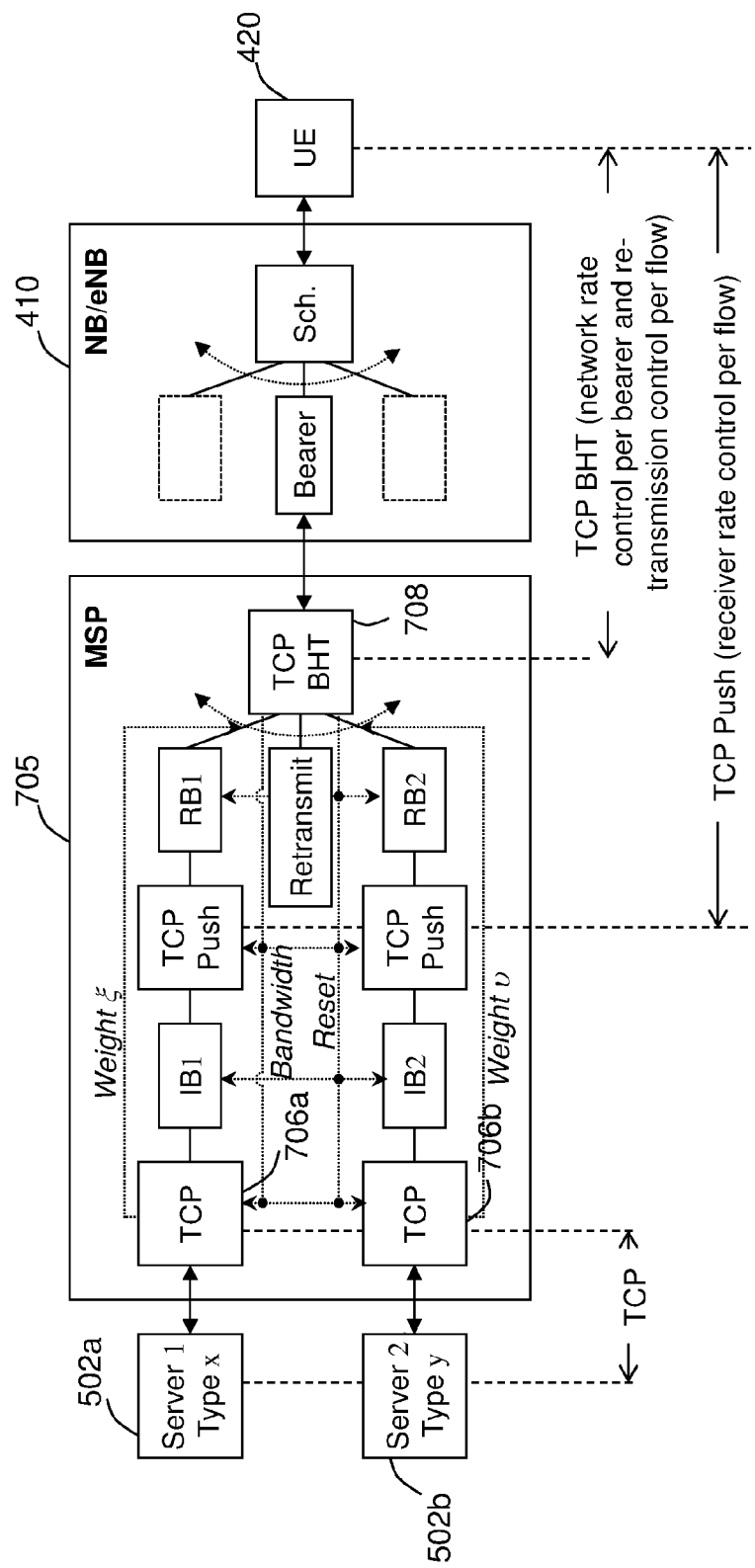
FIG. 7 schematically shows a more detailed view of a system according to a fourth example for exemplifying embodiments herein.

FIG. 7 schematically shows yet another detailed view of a system according to a fourth example for exemplifying embodiments herein. In FIG. 7 it has been added service awareness and it is shown how service awareness may be implemented in a MSP 705. Note that focus in the present example is on differences compared to the above described examples relating to FIGS. 4-6. Information relating to similarities has been left out to avoid unnecessary repetition. In the figure there are TCP agents 706a-b that use different strategies for receiving data from the servers 502a-b and/or for storing data in the IBs (IB1 and IB2). For web pages it may, e.g., be preferred to configure the TCP agent 706a to "pre-fetch" embedded pictures (when content of type x, as provided by server 502a, is web content as mentioned above) in order to reduce response times. When content of type y, as provided by server 502b, is streaming media as mentioned above, it may, e.g., be preferred to configure TCP agent 706b to apply chunk based delivery in order to optimise the usage of radio resources and UE power supplies. The TCP agents 706a-b may differ also in other aspects such as acknowledgement policy etc. Moreover, a "TCP BHT" functionality part 708 may for the pacing discussed above apply weighted polling according to some weights, e.g. ξ "xi" and/or υ "upsilon" as shown in the figure. This may e.g. be used to give priority to streaming media in case of congestion. Also, the "TCP BHT" functionality part 708 may impact said dedicated TCP agents 706a-b to, e.g., delay acknowledgements such that the server 502b if applicable is enabled to estimate the bandwidth and select the most suitable bandwidth and/or resolution for streaming media.

Figure 8:
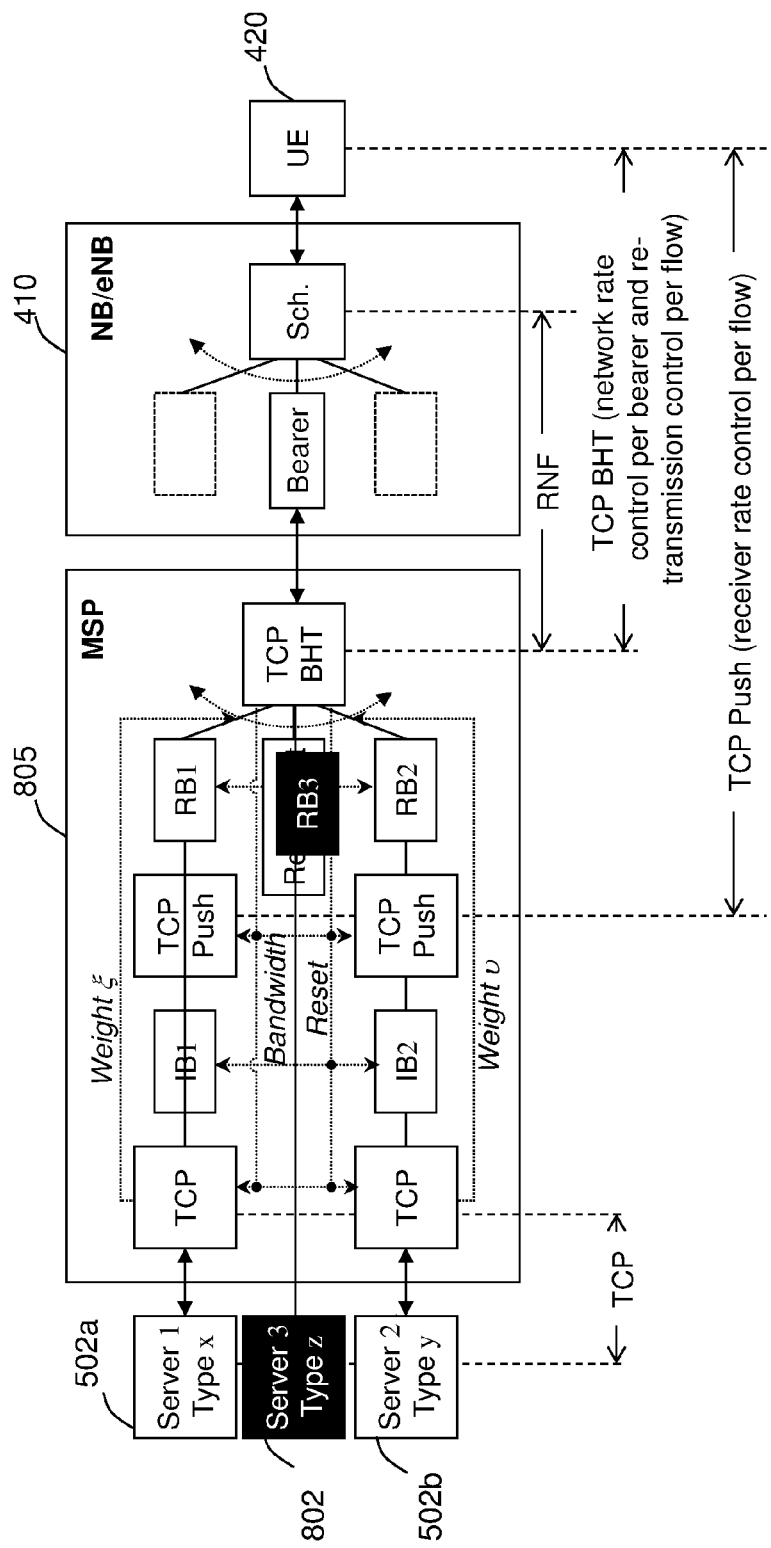
FIG. 8 schematically shows a more detailed view of a system according to a fifth example for exemplifying embodiments herein.

FIG. 8 schematically shows a yet further detailed view of a system according to a fifth example for exemplifying embodiments herein. In FIG. 8 it is shown how non TCP services over the same bearer and/or for the same user and/or destination may be handled in a MSP 805 to allow for controlled, service aware, sharing and to permit accurate congestion control in a network, such as the wireless communication network 100. A server 802 provide content of a type z delivered over some other protocol but TCP, e.g. User Datagram Protocol (UDP). Note that while all data should be counted but only TCP data can be checked, it is possible to combine TCP acknowledgements with records of transmission order to infer acknowledgements of other traffic, e.g. UDP traffic. FIG. 8 also shows further improving of buffer estimation in the base station 410 by using radio network feedback, referred to as RNF in the figure. Such a function could, e.g. bring more accurate information about buffer status in the base station 410 than may be inferred from monitoring outgoing data packets and incoming acknowledgements.

Summarizing the above, full speed (through "TCP Push") may be combined with low delay (through "TCP BHT"). To this end it may be established:

One (real) TCP connection per flow between e.g. "TCP Push" agents and the UE 420, corresponding to "ordinary connections" as mentioned above, for maximising speed.)

A common (virtual) TCP connection e.g. per bearer and/or user and/or any bottleneck, which may be viewed upon as an implicit and intelligent tunnel, for minimizing delays over all flows.

Embodiments herein also enable (i) controlled and tuneable bandwidth sharing on a bearer, (ii) speed up of possible retransmissions, (iii) ease of the load associated with handovers, and (iv) reduction of the waste represented by unwanted data.

It is possible to move different functionalities between the blocks according to the examples and/or to combine (or split) the blocks such that the total number of blocks is decreased (or increased).

FIGS. 9a-c, already mentioned above, are schematic drawings for illustrating embodiments related to computer program embodiments and have been used and discussed above.

The term "radio network node" may refer to any type of network node serving a wireless terminal and/or connected to other network node or network element or any radio node from where a wireless terminal receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, Remote Radio unit (RRU), Radio Remote Head (RRH), nodes in distributed antenna system (DAS) etc.

The term "network node" as used herein may in general refer to any type of radio network node or any network node, which may communicate with at least a radio network node. Examples of network node are:

any radio network node, e.g. Node B, base station, multi-standard radio (MSR) radio node such as MSR BS, eNode B, network controller, radio network controller, base station controller, relay, donor node controlling relay, base transceiver station, access point, transmission points, transmission nodes, RRU, RRH, nodes in distributed antenna system (DAS) etc.;

any core network node, e.g. Mobile Switching Centre (MSC), Mobility Management Entity (MME), PDN Gateway etc., Operation and Maintenance (O&M), Operational Support System (OSS), Self-Organizing Network (SON), positioning node; and any transport network node, e.g. router, switch, etc.

As already indicated in the foregoing, the term wireless terminal and user equipment, as used herein, may e.g. refer to any type of wireless device communicating with a radio network node in a wireless communication network, cellular or mobile communication system. Examples include target device, device to device UE, machine type UE or UE capable of machine to machine communication, PDA, Tablet, mobile terminal, smart phone, laptop embedded equipped (LEE), laptop mounted equipment (LME), USB dongle etc.

In some embodiments a term "bearer" is used and may refer to bearer of data in a general meaning. The bearer may be for a certain type of data content e.g. for provision of a certain service, e.g. streaming video. In a wireless communication network a wireless terminal have ongoing services, for which e.g. a base station serving the wireless terminal have set up a number of radio bearers. Each such radio bearer may correspond to a bearer as used herein. Also, radio bearers having the target node 112 in common for transport of data to a wireless terminal, may correspond to a bearer as used herein. More generally, data flows for a specific wireless terminal, which data flows are grouped per bearer may result in that data flows having the target node 110 in common, typically as a common bottleneck with regard to data transport, are grouped together. The services may be of different types. For example, a service may be a Voice over IP (VoIP) call a user of the wireless terminal initiates. A request is then sent from the wireless terminal to the base station, which request requests resources for the VoIP call. This may be referred to as that the wireless terminal sends a request for a bearer setup. If allowed, the request is accepted, and a radio bearer is set up for the VoIP call and may result in an established TCP connection and TCP flow. Radio bearers are sometimes denoted Radio Access Bearers (RABs), or, in evolved packet systems as LTE, Evolved-RABSs (E-RABs). A radio bearer may be regarded as a virtual connection between two endpoints, which provides a transport service.

Embodiments herein also applies to the multi-point carrier aggregation systems.

Note that although terminology used herein may be particularly associated with certain wireless communication networks, e.g. wireless communication networks based on 3GPP LTE, this should not be seen as limiting the scope of the embodiments herein to only certain wireless communication networks. Other wireless communication networks, including e.g. Wideband Code Division Multiple Access (WCDMA), Wi-Max, Wi-Fi, and GSM may also benefit from exploiting the ideas covered within this disclosure.

Also note that terminology such as service providing entity, first network node, second network node, first data transmission connection, second data transmission connection, first data flow, second data flow, first group, second group, etc., as such should be considering non-limiting and the terminology as such does not imply a certain hierarchical relation. Herein, focus has been on wireless transmissions in the downlink, but the embodiments herein are e.g. also applicable in the uplink.

As used herein, the term "memory" may refer to a hard disk, a magnetic storage medium, a portable computer diskette or disc, flash memory, random access memory (RAM) or the like. Furthermore, the memory may be an internal register memory of a processor.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, unicasting, multicasting and the like. In this context, a transmission by broadcasting may be received and decoded by any authorized device within range. In case of unicasting, one specifically addressed device may receive and encode the transmission. In case of group-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method for supporting transport of data in a wireless communication network, the wireless communication network comprising a first network node and a target node, wherein the transport of data is based on
   one or more first data transmission connections for transmission of one or more first data flows, which one or more first data transmission connections are established between the first network node and one or more service providing entities, and
   one or more second data transmission connections for transport of one or more second data flows, which one or more second data transmission connections are established between the first network node and one or more wireless terminals via the target node, the one or more second data flows being associated with the one or more first data flows,
   wherein the method comprises:
      obtaining, by the first network node, a buffer measure that is indicative of a buffering degree of a buffer used by the target node to buffer data for a first group of the one or more second data flows, and
      controlling, by the first network node, a transmission pace between the first network node and the target node for a second group of the one or more second data flows based on the obtained buffer measure.

2. The method as claimed in claim 1, wherein the first group and/or the second group comprises only second data flows associated with one and the same wireless terminal.

3. The method as claimed in claim 1, wherein the first group and/or the second group comprises only second data flows associated with an area in which the one or more wireless terminals are served by a second network node.

4. The method as claimed in claim 1, wherein the first group and/or the second group comprises only second data flows associated with one and the same bearer of data.

5. The method as claimed in claim 1, wherein the transmission pace is controlled to decrease a delay indicated by the buffer measure.

6. The method as claimed in claim 1, wherein the transmission pace is controlled to keep the buffering degree at the target node at a non-empty level.

7. The method as claimed in claim 6, wherein the transmission pace is controlled to keep the buffering degree below a predetermined level.

8. The method as claimed in claim 1, wherein the transmission pace is further controlled based on awareness of service type associated with at least one of the one or more first data flows.

9. The method as claimed in claim 1, wherein the method further comprises:
obtaining information identifying one or more limits associated with the one or more second data flows; and
controlling, based on the obtained information, one or more transmission rates associated with the one or more second data flows.

10. The method as claimed in claim 9, wherein the one or more limits are received from at least one wireless terminal of the one or more wireless terminals.

11. The method as claimed in claim 9, wherein the information identifying the one or more limits is information identifying one or more receiver or congestion windows associated with the one or more second data flows.

12. The method as claimed in claim 9, wherein the one or more transmission rates are controlled to maximise the one or more transmission rates without exceeding said one or more limits.

13. A computer program comprising instructions which when executed by a processor causes the first network node to perform the method according to claim 1.

14. A computer program product, comprising a non-transitory computer-readable medium storing a computer program according to claim 13.

15. A first network node for supporting transport of data in a wireless communication network comprising the first network node and a target node, wherein the transport of data is based on
one or more first data transmission connections for transmission of one or more first data flows, which one or more first data transmission connections are established between the first network node and one or more service providing entities, and
one or more second data transmission connections for transport of one or more second data flows, which one or more second data transmission connections are established between the first network node and one or more wireless terminals via the target node, the one or more second data flows being associated with the one or more first data flows,
the first network node comprising:
a memory; and
a processor coupled to the memory, wherein the processor is configured to:
obtain a buffer measure that is indicative of a buffering degree of a buffer used by the target node to buffer data for a first group of the one or more second data flows, and
control, based on the obtained buffer measure, a transmission pace between the first network node and the target node for a second group of the one or more second data flows.

16. The first network node as claimed in claim 15, wherein the first group and/or the second group comprises only second data flows associated with one and the same wireless terminal.

17. The first network node as claimed in claim 15, wherein the first group and/or the second group comprises only second data flows associated with an area in which the one or more wireless terminals are served by a second network node.

18. The first network node as claimed in claim 15, wherein the first group and/or the second group comprises only second data flows associated with one and the same bearer of data.

19. The first network node as claimed in claim 15, wherein the processor is further configured to control the transmission pace to decrease a delay indicated by the buffer measure.

20. The first network node as claimed in claim 15, wherein the processor is further configured to control the transmission pace to keep the buffering degree at the target node at a non-empty level.

21. The first network node as claimed in claim 20, wherein the processor is further configured to control the transmission pace to keep the buffering degree below a predetermined level.

22. The first network node as claimed in claim 15, wherein the processor is further configured to further control the transmission pace based on awareness of service type associated with at least one of the one or more first data flows.

23. The first network node as claimed in claim 15, wherein the processor is further configured to:
obtain information identifying one or more limits associated with the one or more second data flows; and
control, based on the obtained information, one or more transmission rates associated with the one or more second data flows.

24. The first network node as claimed in claim 23, wherein the one or more limits are received from at least one terminal of the one or more wireless terminals.

25. The first network node as claimed in claim 23, wherein the information identifying the one or more limits is information identifying one or more receiver or congestion windows associated with the one or more second data flows.

26. The first network node as claimed in claim 23, wherein the processor is further configured to control the one or more transmission rates to maximise the one or more transmission rates without exceeding the one or more limits.

* * * * *